(12) United States Patent
Chang et al.

(10) Patent No.: US 6,339,872 B1
(45) Date of Patent: Jan. 22, 2002

(54) METHOD OF MAKING A MERGED MAGNETIC HEAD THAT INCLUDES A WRITE HEAD WITH SINGLE-SIDED NOTCHED FIRST POLE PIECE

(75) Inventors: Thomas Young Chang; Edward Hinpong Lee; Jyh-Shuey Jerry Lo, all of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,155

(22) Filed: May 3, 2000

Related U.S. Application Data

(62) Division of application No. 08/876,451, filed on Jun. 16, 1997, now Pat. No. 6,201,670.

(51) Int. Cl.[7] .................................................. G11B 5/42
(52) U.S. Cl. ................................ 29/603.14; 29/603.15; 216/22; 216/66; 360/317
(58) Field of Search ......................... 29/603.14, 603.15, 29/603.13; 216/22, 66; 360/317

(56) References Cited

U.S. PATENT DOCUMENTS 5,438,747 A * 8/1995 Krounbi et al. .......... 29/603.14
5,809,637 A * 9/1998 Rottmayer ............... 29/603.15

\* cited by examiner

*Primary Examiner*—Carl E. Hall
(74) *Attorney, Agent, or Firm*—Ervin F. Johnson

(57) ABSTRACT

A single-sided, notched write head is provided for writing narrow erase band servo tracks as well as a double-notched write head, and for writing data tracks better than a double-notched write head. The single-sided, notched write head writes a narrow erase band on the notched side and a wide erase band on the unnotched side. In one embodiment, only one side of the first pole piece layer is notched, and in another embodiment a first side of the first pole piece layer is notched more than a second side. By writing servo tracks only a fraction of the track width of the write head, a wide erase band region is overwritten so that a narrow erase band is on each side of the servo track. Data tracks are written with a narrow erase band on one side and a wide erase band on the other side. The wide erase band on one side of the data track allows more flexibility in spacing the read head from adjacent tracks. The single-sided, notched write head can be manufactured with methods that require less processing time than a double-notched write head. In one method, a notching layer is employed where removal of a small corner of the notching layer provides the first pole piece with a notch. Other methods employ photoresist to protect the side of the first pole piece that is not to be notched, and/or oscillating the workpiece less than 360°C. so that milling is more concentrated at the notch site.

20 Claims, 12 Drawing Sheets

METHOD OF MAKING A MERGED MAGNETIC HEAD THAT INCLUDES A WRITE HEAD WITH SINGLE-SIDED NOTCHED FIRST POLE PIECE

CROSS REFERENCE TO RELATED PATENTS REFERENCED TO RELATED APPLICATION

This is a divisional application of application Ser. No. 08/876,451 filed Jun. 16, 1997, now U.S. Pat. No. 6,201,670.

Cross reference is made to commonly assigned U.S. Pat. No. 5,438,747 and commonly assigned U.S. Pat. No. 5,452,164 which are incorporated by reference herein.

BACKGROUND OF THE INVENTION

1. Field of the Invention

The present invention relates to a merged MR head made by notching the first pole piece of the head's write element with a notching layer, and also to forming a notched first pole piece with a first pole piece layer and the notching layer, and then milling a second pole piece layer, a gap layer and the notching layer until side walls of the second pole piece layer, gap layer and notching layer are contiguous.

2. Description of the Related Art

A write head is typically combined with a magnetoresistive (MR) read head to form a merged MR head, certain elements of which are exposed at an air bearing surface (ABS). The write head comprises first and second pole pieces connected at a back gap that is recessed from the ABS. The first and second pole pieces have first and second pole tips, respectively, which terminate at the ABS. An insulation stack, which comprises a plurality of insulation layers, is sandwiched between the first and second pole pieces, and a coil layer is embedded in the insulation stack. A processing circuit is connected to the coil layer for conducting write current through the coil layer which, in turn induces write fields in the first and second pole pieces. A non-magnetic gap layer is sandwiched between the first and second pole tips. Write fields of the first and second pole tips at the ABS fringe across the gap layer. In a magnetic disk drive, a magnetic disk is rotated adjacent to, and a short distance (fly height) from, the ABS so that the write fields magnetize the disk along circular tracks. The written circular tracks then contain information in the form of magnetized segments with fields detectable by the MR read head.

The MR read head includes an MR sensor sandwiched between first and second non-magnetic gap layers, and located at the ABS. The first and second gap layers and the MR sensor are sandwiched between first and second shield layers. In a merged MR head, the second shield layer and the first pole piece are a common layer. The MR sensor detects magnetic fields from the rotating disk by a change in resistance that corresponds to the strength of the fields. A sense current is conducted through the MR sensor, where changed in resistance cause voltage changes that are received by the processing circuitry as readback signals. One or more merged MR heads may be employed in a magnetic disk drive for reading and writing information on circular tracks of a rotating disk.

Good design dictates that the write head writes with a wide track profile, while the read head reads a more narrow track profile in order that the read head not pick up signals from adjacent tracks in the presence of track misregistration. Signals picked up from adjacent tracks result in poor readback performance. The write head is also employed to write servo signals on the magnetic disk, in spaced apart sectors dedicated for servo signals. The disk typically has allocated regions dedicated for the imbedded servo information. The servo signals are read by the read head and employed by servo processing circuitry to maintain the write head on track.

In the prior art, the first pole piece layer of the write head has been notched to improve its servo writing performance. The notching forms a portion of the first pole piece into a pedestal with first and second side walls that align with first and second side walls of the second pole tip. With notching, the fringe field at the gap between the second pole tip and the first pole piece is limited to the width of the second pole tip, which defines the width of tracks written on a disk. This is because the field is captured by the pedestal instead of spreading out laterally to the flat portion of the first pole piece on each side of the second pole tip. Accordingly, tracks on the magnetic disk have narrow erase bands. From a servo perspective, narrow erase bands improve the quality of the servo pattern which consists of phase aligned transitions. However, data tracks favor wider erase bands which diminishes interference from adjacent tracks in the presence of track misregistration. Since servoing cannot be sacrificed, there is a strong felt need for a write head that writes good servo tracks, but is better than the prior art at writing data tracks.

Typically, a second pole piece, along with its second pole tip, is constructed by frame-plating it on top of the gap layer. After depositing a seed layer on the gap layer, a photoresist layer is spun on the seed layer, imaged with light, and developed to provide an opening surrounded by a resist wall for plating the second pole piece with its second pole tip. To produce a second pole tip with a narrow track width, the photo-resist layer has to be relatively thin. This relationship, referred to as the "aspect ratio", is the ratio of the thickness of the photoresist layer in the pole tip region to the track width of the second pole tip. Preferably, the aspect ratio should be on the order of three. In other words, for a track width of 1 $\mu$m, the thickness of the photoresist in the pole tip region should be about 3 $\mu$m. If the photoresist is thicker than this, the side walls of the second pole tip, especially at the base, will not be well formed due to scattering of light as it penetrates the photoresist layer during the imaging step.

A prior art process for notching the first pole piece entails ion beam milling the gap layer and the first pole piece, employing the second pole tip as a mask. According to this prior art process (typified in U.S. Pat. No. 5,452,164 and U.S. Pat. No. 5,438,747) a full film gap layer is formed on a first pole piece layer, followed by frame plating a second pole piece layer and pole tip on the gap layer. The second pole tip layer is employed as a mask during milling of notches in the second pole tip layer. The direction of milling beam forms an angle to a vertical axis while the workpiece is rotated. The procedure first mills through the gap layer, and next mills the first pole piece layer to form the notches. Since each notch site is directly below a respective side wall of the second pole tip, each notch site is milled for about 180° of the rotation, and then is shadowed by the second pole tip, preventing milling for the next 180° of rotation.

In order to account for windage (material consumed by processing), the second pole tip is frame plated, wider than a desired target track width, and thicker than a desired height. During milling of the gap layer to form the write gap, the top and first and second side walls of the plated second pole tip layer are partially consumed. During milling of the first pole piece layer to form the notches, the tope and first and second side walls of the second pole tip layer are still further partially consumed. During both milling times, milled material is redeposited on the side walls of the second pole tip. This is removed by angling the milling beam closer to a normal to the side walls. This process, referred to as clean-up, requires extra milling time. Because of the long processing time and large windage of the second pole tip it is difficult to keep the track width and the pole tip height within acceptable limits. When the limits are exceeded, a wafer with literally thousands of magnetic head sites must be discarded. Further, increasing the height of the plated second pole tip layer to account for windage, increases the aforementioned aspect ratios, making it difficult to construct a well-defined second pole tip with a submicron track width. Track widths 1 μm or less are desirable to increase tracks per inch (TPI) written on the disk.

Accordingly, there is a strong felt need to reduce the processing time required for notching, without sacrificing narrow track widths and quality of the write head.

SUMMARY OF THE INVENTION

We have discovered that a single-sided, notched write head writes narrow erase band servo tracks equally well as a doubled-notched write head since the servo pattern is written with only one side of the write head. This produces a superior servo pattern compared to the conventional merge write head. For data performance, this implies that the single sided notch head is not as good as the merged head for mitigating side interference, but is better than the dual-sided notched write head. The single-sided notched write head will write a narrow erase band on the notched side and a wide erase band on the side that is not notched. In one embodiment, only one side of the first pole piece layer is notched, and in another embodiment, a first side of the first pole piece layer is notched more than a second side thereof. In operation, the single-sided, notched write head is moved a distance less than the track width of the write head for each servo track written on the disk. For instance, if the write head is moved over one-half a track width for each servo track, servo tracks can be written with a narrow erase band on each side of each servo track. Accordingly, the single-sided, notched write head can write servo tracks equally well as doubled-sided, notched write head. Data tracks will be written with a narrow erase band on one side and a wide erase band on the other side. This is a better configuration for read head performance than one with a narrow erase band on both sides of the data track. The wide erase band on one side of the data track allows greater flexibility in spacing the read head from adjacent tracks.

The construction of a single-sided, notched write head requires less time to construct than a double-sided, notched write head. We have provided several methods of construction. Generally, the windage of the second pole tip can be reduced by $\sqrt{2}$. In one method, the second pole tip is frame-plated on the gap layer, and photoresist is employed for protecting a side of the first pole piece layer that is not to be notched. Milling is then employed for notching only one side of the first pole piece layer. With this arrangement, there is less redeposition since material on only one side is milled. Accordingly, the milling time necessary for clean-up is shortened. Further, the workpiece can be oscillated back and forth 180° so that the notch site is literally constantly milled, without being shadowed during 180° of the rotation. The processing time is significantly reduced, reducing the windage of the second pole tip. As stated hereinabove, less windage keeps the desired track width and pole tip height within acceptable limits. The method promotes constructing second pole tips with a track width of 1 μm or less. Another method employs a notching layer on top of the first pole piece layer. The notching layer is slightly wider than the target track width, on the side to be notched, and has a wide lateral expanse, on the side that is not to be notched. On the side to be notched, a small corner of the notching layer is exposed beyond the second pole tip. Upon rotating the workpiece, the small corner is quickly milled away while the large expanse of the notching layer on the other side of the second pole tip is only slightly notched. This produces an embodiment of the invention where one side of the first pole piece layer is notched significantly more than the other side.

An object of the present invention is to provide a single-sided, notched write head that has the same servo writing capability as a double-notched write head, but improved data writing capability.

Another object is to provide a method of making a notched write head that requires less processing time than a double-notched write head for the purpose of constructing a second pole tip with a track width of 1 μm or less.

A further object is to provide a notched write head that has a better-defined, and narrower, second pole tip than a double-notched write head.

Yet another object is to provide a method of notching a first pole piece with more control of the target height and target width of the second pole tip.

Still another object is to provide a method of notching a first pole piece of a write head with less consumption of a second pole tip, and with less redeposited material to clean up after the notching.

Still a further object is to provide a method wherein single-sided notching of a write head can be performed.

Still another object is to provide a single-sided, notched write head that writes narrow erase band servo tracks equally as well as a doubled-notched write head, writes data tracks better than a double-notched write head, and requires less time to produce than a double-notched write head.

Other objects and attendant advantages of the invention will be appreciated upon reading the following description taken together with the drawings.

DESCRIPTION OF THE PREFERRED EMBODIMENT

Figure 1:
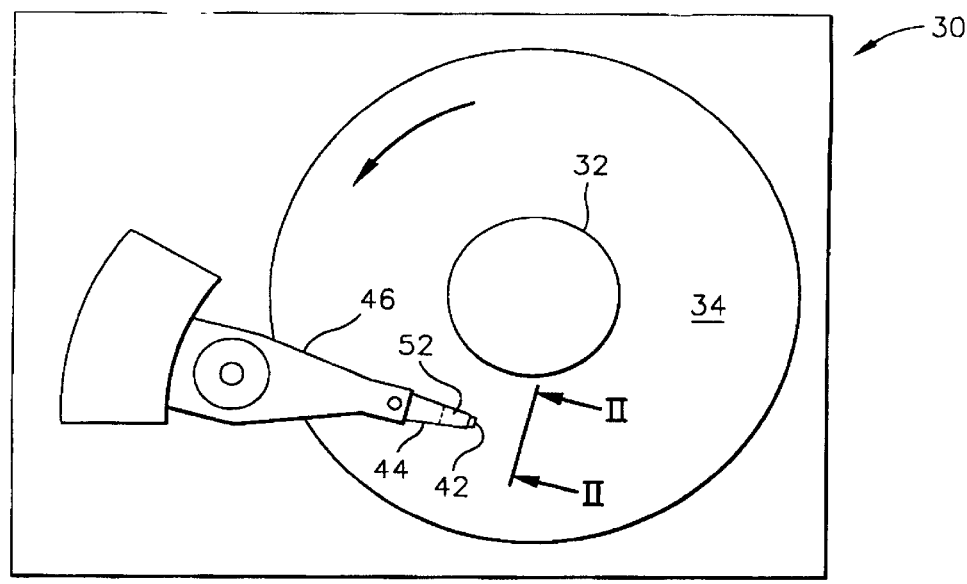
FIG. 1 is a planar view of an exemplary magnetic disk drive.
Figure 2:
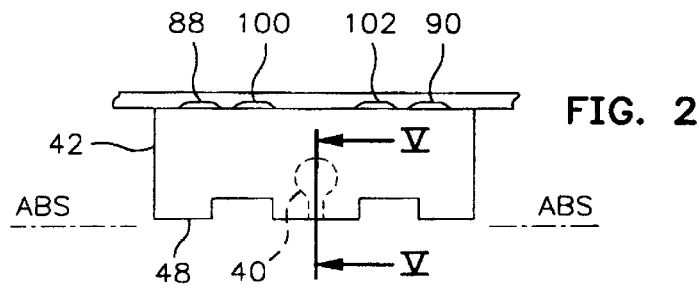
FIG. 2 is an end view of a slider with a magnetic head of the disk drive as seen in plane II'II.
Figure 3:
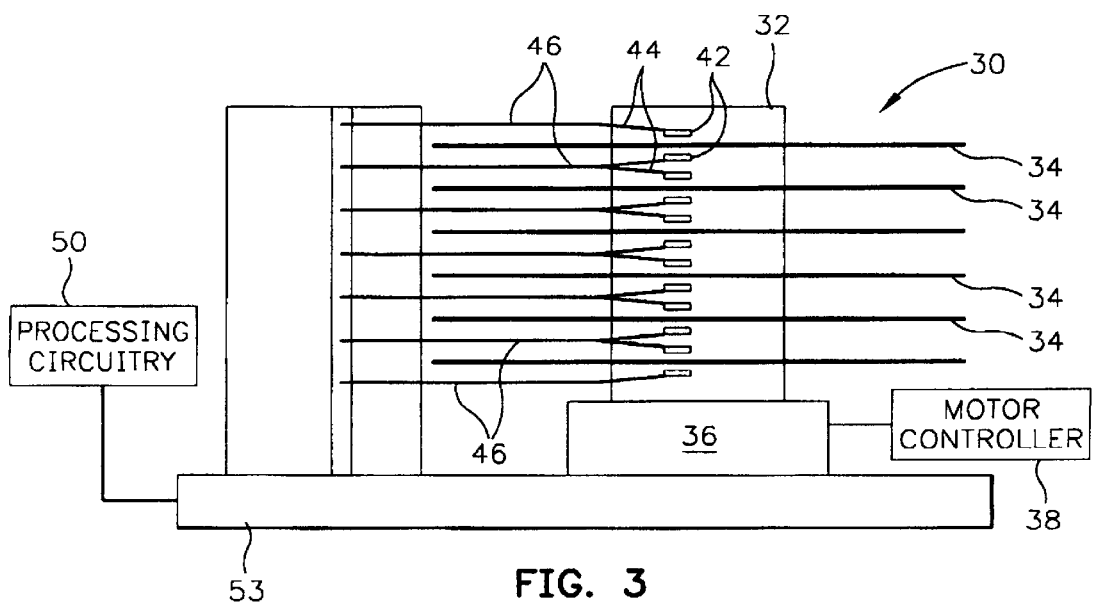
FIG. 3 is an elevation view of the magnetic disk drive wherein multiple disks and magnetic heads are employed.

Referring now to the drawings, wherein like reference numerals designate like or similar parts throughout the several views, there is illustrated in FIGS. 1–3 a magnetic disk drive 30. The drive 30 includes a spindle 32 that supports and rotates a magnetic disk 34. The spindle 32 is rotated by a motor 36 that, in turn, is controlled by a motor controller 38. A horizontal combined magnetic head 40 for reading and recording is mounted on a slider 42. The slider 42 is supported by a suspension 44 and actuator arm 46. A plurality of disks, sliders and suspensions may be employed in a large capacity direct access storage device (DASD), as shown in FIG. 3. The suspension 44 and actuator arm 46 position the slider 42 to locate the magnetic head 40 in a transducing relationship with a surface of the magnetic disk 34. When the disk 34 is rotated by the motor 36, the slider is supported on a thin (typically, 05 μm) cushion of air (air bearing) between the disk and an air bearing surface (ABS) 48.

Figure 4:
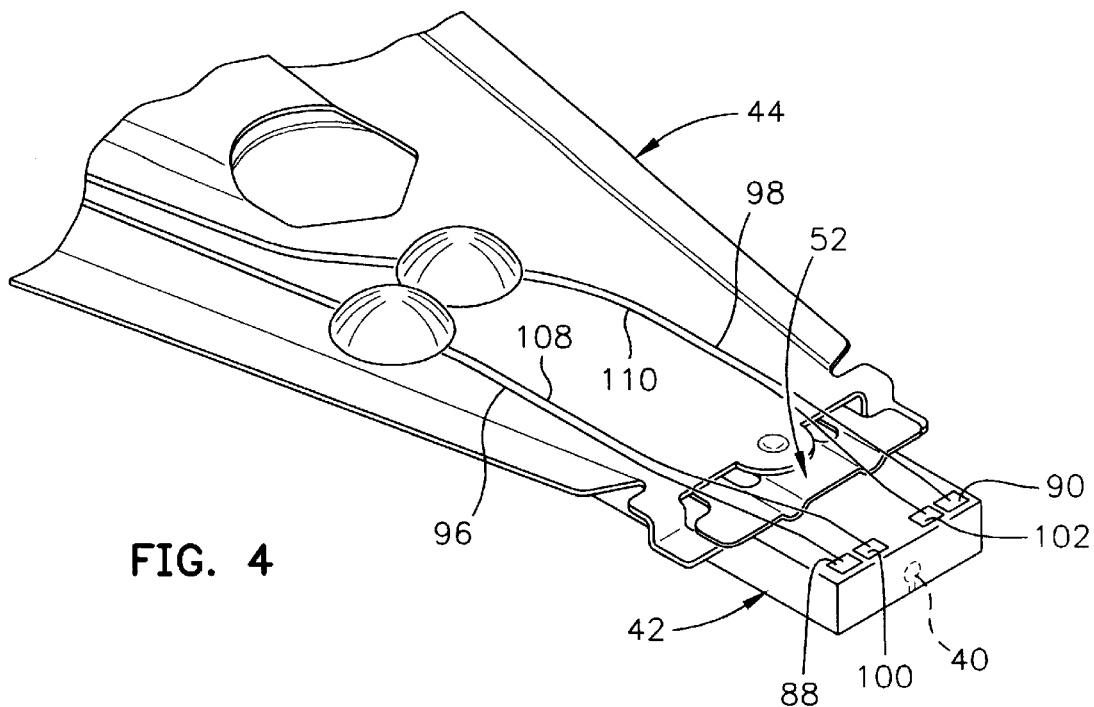
FIG. 4 is an isometric illustration of an exemplary suspension system for supporting the slider and magnetic head.

The magnetic head 40 may be employed for writing information to multiple circular tracks on the surface of the disk 34, as well as for reading information therefrom. Processing circuitry 50 exchanges signals representing such information with the head 40, provides motor drive signals, and also provides control signals for moving the slider 42 to various tracks. In FIGS. 1 and 4 the slider 42 is shown mounted to a head gimbal assembly (HGA) 52 that is mounted to the suspension 44. All of the above components are supported on a base 53.

Figure 5:
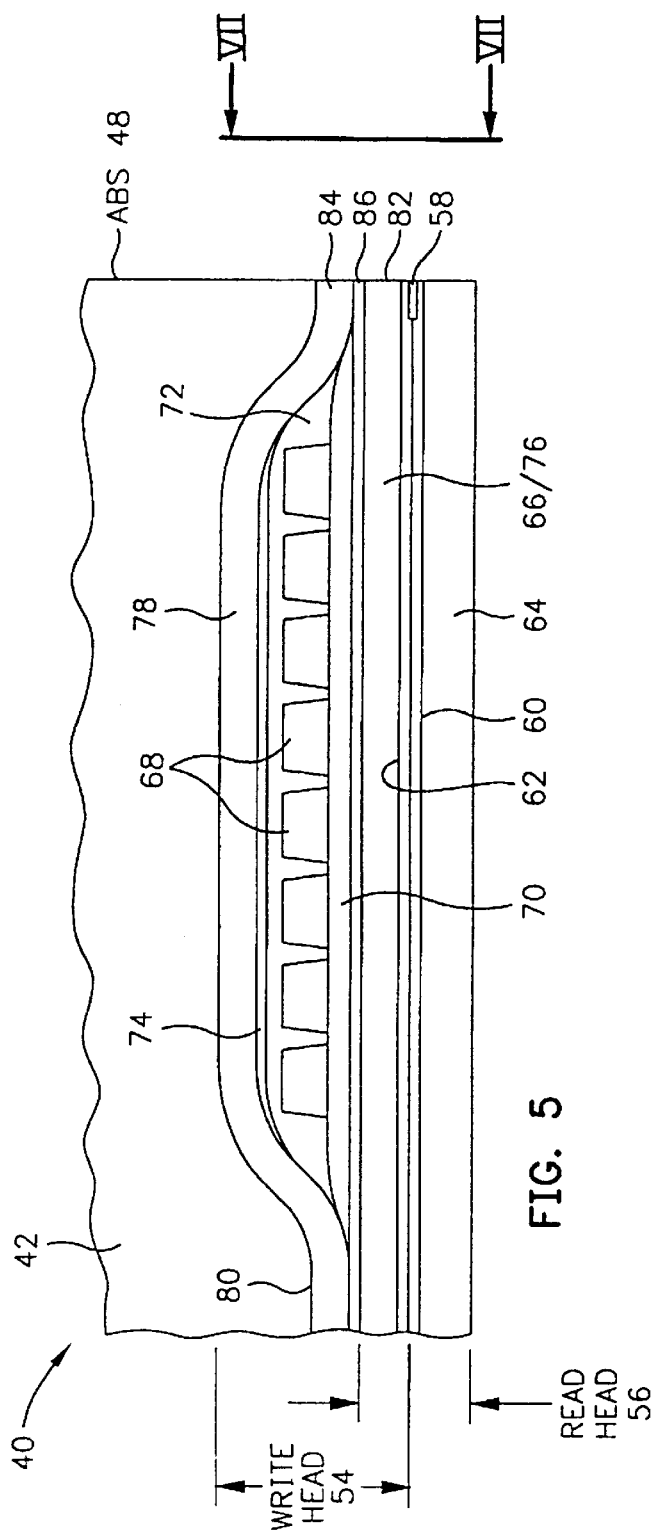
FIG. 5 is a partial elevation view of the slider and magnetic head as seen in plane V—V of FIG. 2.
Figure 7:
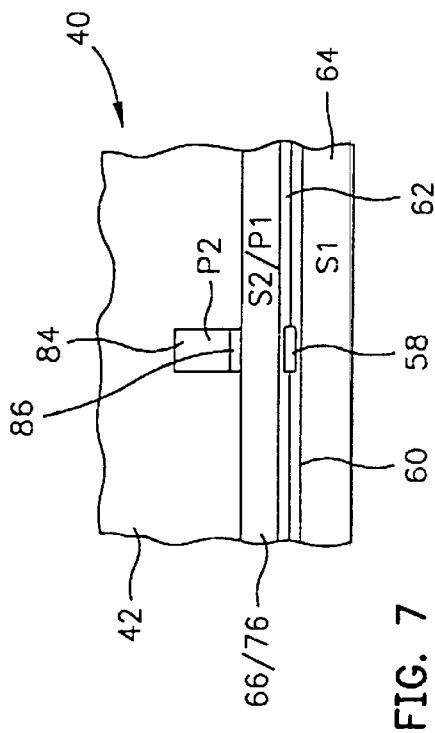
FIG. 7 is a partial ABS view of the slider taken along plane VII—VII of FIG. 5 to show the read and write elements of the magnetic head.

FIG. 5 is a side cross-sectional elevation view of a merged magnetoresistive (MR) head 40, with a write head portion 54 and a read head portion 56. The read head portion includes an MR sensor 58. The MR sensor 58 is sandwiched between first and second gap layers 60 and 62 that are, in turn, sandwiched between first and second shield layers 64 and 66. In response to external magnetic fields, the resistance of the MR sensor 58 changes. A sense current conducted through the sensor causes these resistance changes to be manifested as potential changes, which are processed by the processing circuitry 50 shown in FIG. 3.

Figure 6:
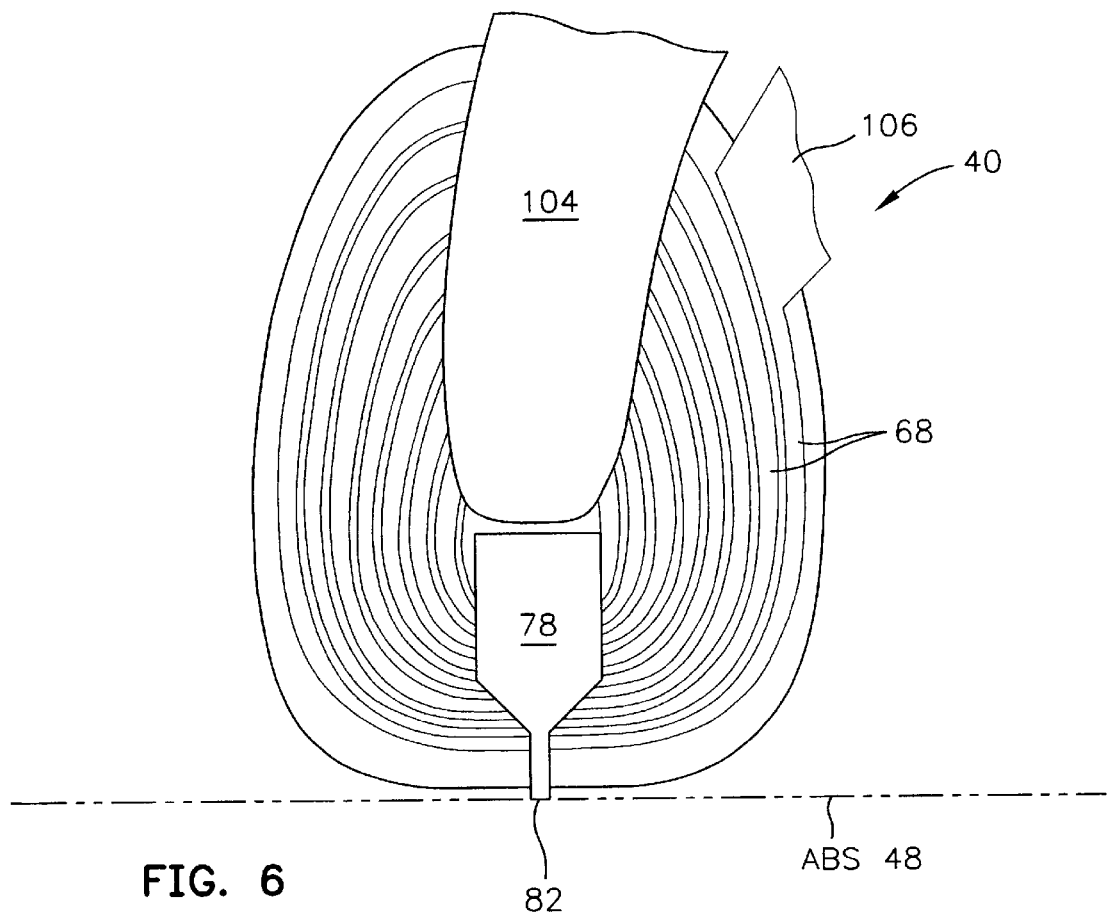
FIG. 6 is a view taken along plane VI—VI of FIG. 5 with all material above the second pole piece removed.

The write head portion 54 of the head includes a coil layer 68 sandwiched between first and second insulation layers (I1 and I2) 70 and 72. A third insulation layer (I3) 74 may be employed for planarizing the head to eliminate ripples in the second insulation layer caused by the coil layer 68. The first, second and third insulation layers are referred to as an "insulation stack". The coil layer 68, and the first, second and third insulation layer 70, 72 and 74, are sandwiched between first and second pole piece layers (S2/P1) 76 and (P2) 78. The first and second pole piece layers 76 and 78 are magnetically coupled at a back gap 80, and have first and second pole tips 82 and 84 that are separated by a non-magnetic gap layer (G3) 86 at the ABS. As shown in FIGS. 2 and 4, first and second solder connections 88 and 90 connect leads (not shown) from the MR sensor 58 to leads 96 and 98 on the suspension 44; third and fourth solder connections 100 and 102 connect leads 104 and 106 from the coil 68 (see FIG. 6) to leads 108 and 110 on the suspension.

One or more sectors of the magnetic disk are dedicated for servoing. The write head writes servo tracks in these sectors, which are read by the read head to position the magnetic head on the disk. It is desirable that the servo tracks be separated by narrow erase bands in order to obtain greater precision in servoing. An erase band defines a cross track distance between magnetic servo signals.

Narrow erase bands are desirable in servo tracks. Wide erase bands sacrifice servo signals amplitude, and also contribute to position error signal (PES) non-linearity. A write head with no notching produces servo tracks with large erase bands. In some disk files, wide erase bands reduce the servo signal by as much as 40% of the full track amplitude. This may exceed a limit of acceptability and result in a significant manufacturing yield loss.

Figure 8:
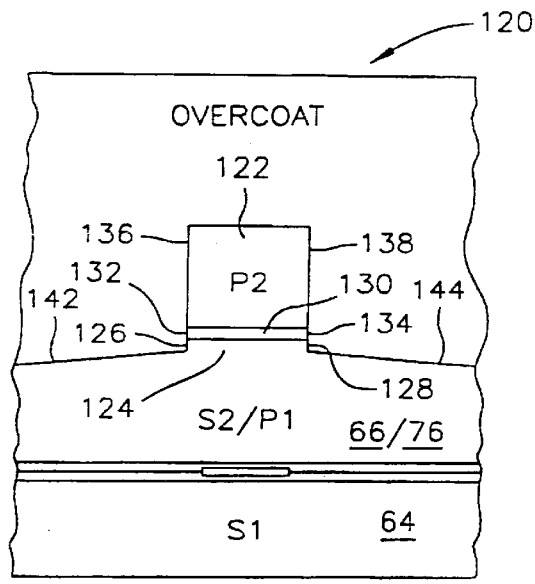
FIG. 8 is an ABS view of a prior art double-notched write head.

FIG. 8 shows a prior art magnetic head 120 with a double-notched structure that produces narrow erase bands.

The first pole piece layer 66/76 has been notched on both sides of a second pole tip 122 to form a pedestal 124 with first and second sides 126 and 128. On the pedestal 124 is a gap layer 130 that has first and second sides 132 and 134. On the gap 130 is the second pole tip with first and second sides 136 and 138. The first side wall 136, 132 and 126 of the layers are contiguous and the second side walls 138, 134 and 128 of the layers are contiguous. With this arrangement, there is very little side writing because the flux from the second pole tip 122 is transferred to the pedestal 124, rather than to large lateral expanses 142 and 144 of the first pole piece layer. This enables the notched write head to write servo tracks with narrow erase bands. The disadvantage with the double-notched write head 120 is that data tracks written by the head also have narrow erase bands, leaving little room for error in positioning the read head over a written track, and increasing the likelihood that the read head will pick up data information from adjacent tracks.

Figure 9:
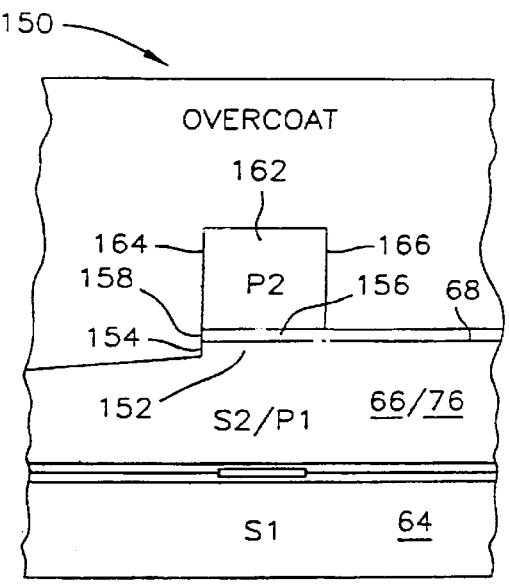
FIG. 9 is an ABS view of the present single notched write head.

In FIG. 9, there is shown the present single notched write head 150. The first pole piece layer 66/76 has a raised portion 152 that has a first side wall 154. On the raised portion 152 is a gap layer 156 that has a first side 158. On the gap layer 156 is a second pole tip 162 that has first and second sides 164 and 166. In the single notched write head, the first sides 164, 158 and 154 of the layers are contiguous, while the raised portion 152 on the other side of the second pole tip 162 has a large lateral expanse 168. With the present magnetic head, the erase band on the left side of the second pole tip 162 will be narrow, while the erase band on the right side thereof will be wide. It should be noted, however, that the single-notched write head 150 can write a servo pattern of the same quality as the double-notched write head 120 in FIG. 8, as explained in the next paragraph.

Figure 11:
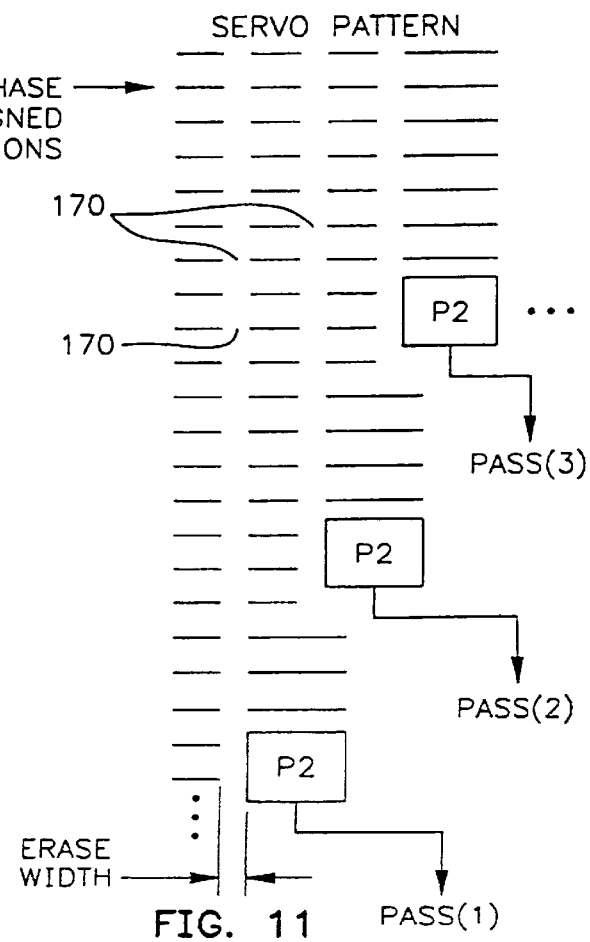
FIG. 11 is a schematic illustration of a servo pattern written by the single notched write head.

FIG. 11 shows a servo pattern that can be written by the single-sided, notched write head 150, with narrow erase bands shown at 170. The servo pattern may be formed by writing exemplary all ones transitions in the first path, for example. The head is then moved in the cross-track direction, by a small amount, which is less than the track width. The same pattern is written in phase with the previously-written adjacent track. This process is repeated from the ID to the OD of the disk. The reduction in the side writing field substantially eliminates the erase bands in the phase aligned patterns. Such patterns significantly increase the magnitude of the servo signal, and improve position error signal (PES) linearity, which ultimately increase file yield. Since servo patterns can be formed by overwriting previously written tracks with one edge of the pole tip, a single-sided, notched write head can write servo patterns with the same high quality as the double-notched write head 120 in FIG. 8.

Figure 10:
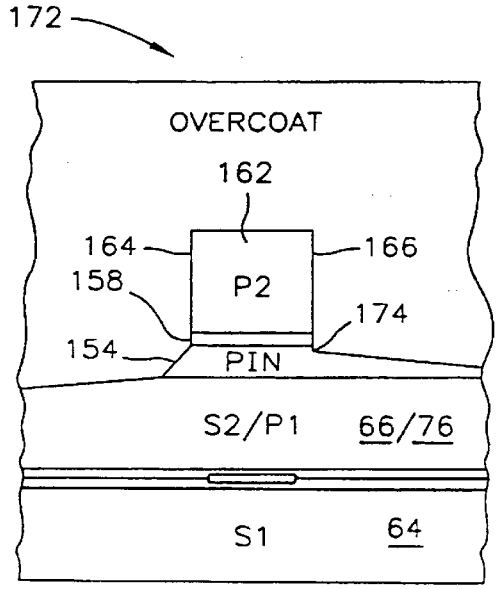
FIG. 10 is an ABS view of another embodiment of the single notched write head with a partial notch on an opposite side.

Another embodiment 172 of the present invention, shown in FIG. 10, is notched in the same manner on the left side of the pole tip 154, with first side wall 164, 158 and 154 of the layers contiguous. The embodiment 172 differs from the embodiment 150 in that the first pole piece layer 66/76 has a partial notch 174 on the opposite side of the second pole tip 162. The embodiment 172 is a result of one of the present methods of making the single notched write head which is described hereinafter. Accordingly, the embodiment 172 is considered a single notched write head from the standpoint that the notching depth at 154 is significantly greater than the notching depth at 174. In any event, the broad concept of the single-sided notched write head includes double-notching where one notch is greater depth than the other notch, as shown in FIG. 10, as well as no notching on one side, as shown in FIG. 9. The embodiment 172 has essentially the same advantage in writing a narrow-erase banded servo pattern as the embodiment 150.

One advantage of the embodiments shown in FIGS. 9 and 10 is that they can write better data tracks than the prior art double-notched write head 120 in FIG. 8. A data track written by either of the embodiments in FIGS. 9 and 10 will have a narrow erase band on one side, and a wide erase band, on an opposite side, of the second pole tip. This is in contrast to a data track written by the prior art magnetic head 120 which writes the data track with a narrow erase band on each side of the track. A data track written by the prior art magnetic head 120 is closer to adjacent tracks, which can lead to a read head picking up data signals from adjacent tracks, thereby resulting in poor data performance. There is a wider band between adjacent data tracks written by the present embodiments 150 and 172, thereby minimizing pick up by the read head from adjacent tracks. Other advantages of the present embodiments 148 and 158 lie in the methods of making, described hereinafter.

Figure 12:
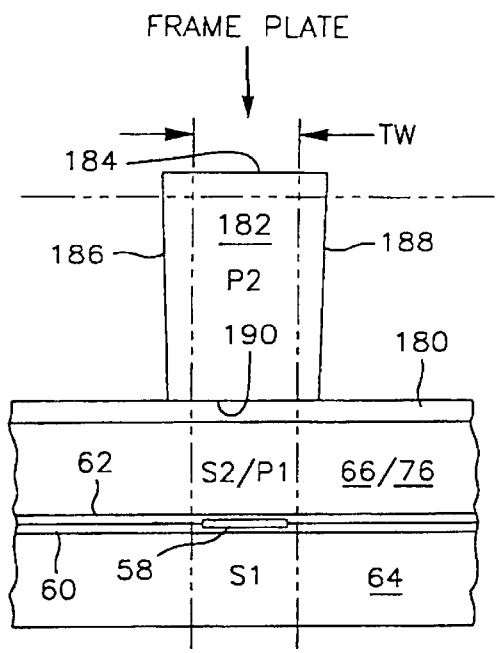
FIG. 12 is an ABS view of an initial step in the making of the prior art notched write head.
Figure 13:
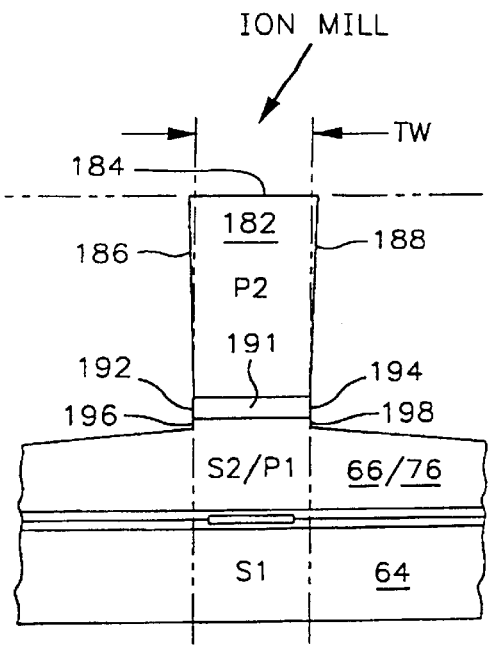
FIG. 13 is an ABS view of the prior art double-notched write head after making it with the prior art method.

FIGS. 12 and 13 show a prior art method of making a prior art merged magnetic head, wherein the second shield of the read head and the first pole piece of the write head are a common layer 66/76. The gap layer 180 has been former on the first pole piece layer 66/76, followed by frame plating a second pole tip 182 on the gap layer 180. The second pole tip 182 is a front portion of the second pole piece exposed at the ABS, as seen in FIG. 12. The second pole tip is bounded by a top 184 first and second side walls 186 and 188, and a base 190. The target track width (TW) is shown in FIG. 12. Since the first pole piece 66/76 will be notched by ion milling, the second pole tip 182 is wider than a target size track width (TW), and higher than a target height of the final second pole tip, so as to allow for consumption of the second pole tip during a subsequent milling cycle. Accordingly, before milling, the first and second side walls 186 and 188 extend beyond the target track width (TW), and the top 184 is higher than the target height. The dimensions of these sacrificial portions is referred to in the art as windage.

In FIG. 13 ion milling is employed to mill through the gap layer to form a write gap 191 with first and second side walls 192 and 194 and to mill notches into the first pole piece 66/76 with first and second side walls 196 and 198. After milling, the first side walls 186, 192, and 196 are contiguous, and the second side walls 188, 184 and 198 are contiguous. This notching improves the transfer of flux between the second pole tip 122 and the first pole piece 66/76, since the flux will go to the pedestal portion of the first pole piece, instead of to the larger expanse thereof. This improves side writing. The milling beams is angled with respect to a normal to the layers 66/76 and 64, in order to minimize redeposition of the milled material. The angle of the beam is typically 20°–35°. It should be understood that the partially completed magnetic head in FIG 12 rests upon a substrate (not shown), which is rotated during the milling cycle. The second pole tip 182 is employed as a mask for forming the write gap 190 and notching the first pole piece at 196 and 198. Because of the angled milling, the second pole causes shadowing at the notching sites 136 and 138 during approximately 180° of the rotation. This shadowing increases the processing time required to form the notches 196 and 198 in the first pole piece 66/76. The downward sloping portions of the first pole piece layer 66/76 in FIG. 13 are due to the shadowing by the second pole tip 122.

After milling, the second pole tip 182 has been reduced to the size shown in FIG. 13. With the prior art method it is difficult to reduce the second pole tip 182 to the target track width and the target height because of the significant time required for milling the large lateral expanse of the first pole tip 66/76. Milling of flat surfaces is very time-consuming as compared to milling side walls. Further, the extra height of the top 184 of the second pole tip in FIG. 12 increases the aspect ratio (ratio between height of resist employed to frame plate the second pole tip 182 and the target track width), which reduces the line width of the second pole tip. Prior art methods of notching the first pole piece are discussed in commonly assigned U.S. Pat. Nos. 5,438,747 and 5,452,164. A strong-felt need is manifested in these references to reduce the time required to notch the first pole piece of a write head.

Figure 14:
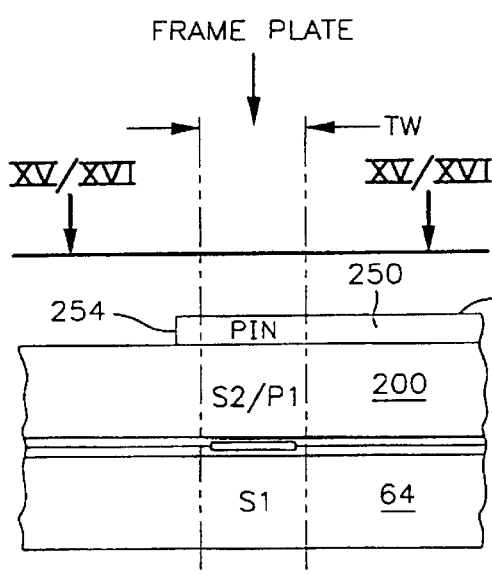
FIG. 14 is an ABS view of the first step in the making of the single notched write head.

FIGS. 14–23 illustrate a first method of the invention, which implements single-sided notching of the first pole piece 66/76. In FIG. 14, a notching layer 250 (PIN) is frame plated on the first pole piece layer 200. The first pole piece includes the first pole piece layer 200 and the notching layer 250. The notching layer 250 has a top 252 and a first side wall 254. The notching layer 250 has a large expanse, which may coincide with the lateral expanse of the first pole piece layer 200 as it extends away from the first side wall 254. Accordingly, the notching layer 250 has only one corner formed by the side wall 254 which is milled in a subsequent step for notching purposes.

Figure 15:
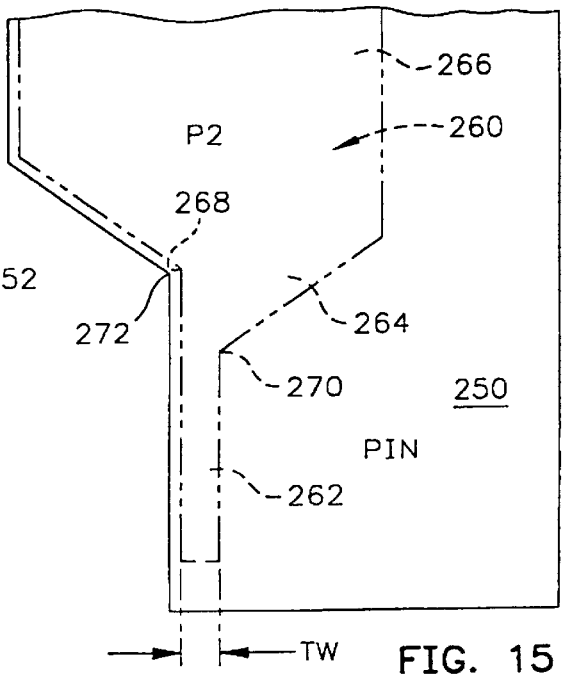
FIG. 15 is a view taken along plan XV—XV of FIG. 14.
Figure 16:
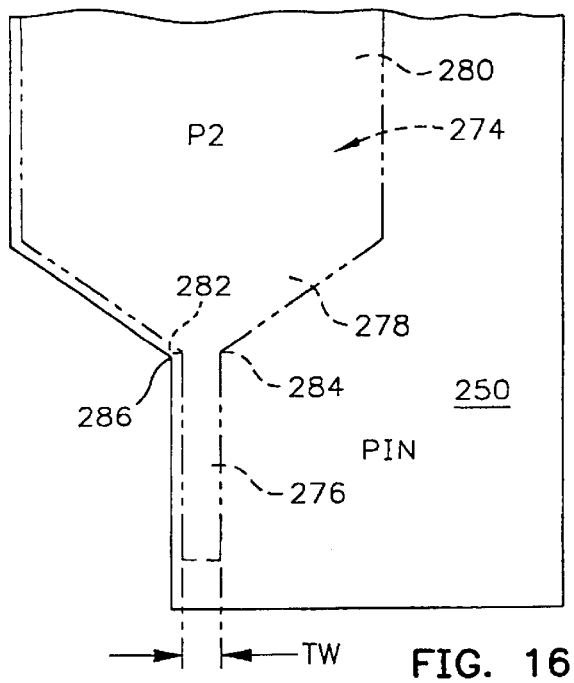
FIG. 16 is a plan view taken along plane XVI—XVI of FIG. 14.

Two embodiments of a planar shape of the notching layer 250 are shown in FIGS. 15 and 16. In FIG. 15, the second pole piece is shown in phantom at 260, with a pole tip region 262, a flare region 264 and a yoke region 266, the commencement of the flare region 264 being shown at the flare points 268 and 270. In this embodiment the flare point 268, which is on the side where the notching layer 250 is to be notched, is recessed farther into the head than the flare point 270. Accordingly, the notched layer 250 is provided with an inside corner 272 which is adjacent to the flare point 268 and matches the flare 264 back to the yoke region 266. On the other side of the pole tip region 262, where the flare point 270 is located, notching will not be implemented, and the notching layer 250 provides a wide lateral expanse extending from the pole tip region 262. In this embodiment, the notching layer 250 is frame plated with a planar shape, as shown in FIG. 15.

Another embodiment of the notching layer 250 is shown in FIG. 16. In this embodiment the second pole piece 274 has a pole tip region 276, a flare region 278 and a yoke region 280. The flare region 278 commences at the flare points 282 and 284. In this embodiment, the notching layer 250 has an inside corner 286 which is adjacent the flare point 282 and extends along just the outside of the flare region 278 and the yoke region 280. The notching layer 250 on the opposite side of the pole tip region 276 has a large lateral expanse, the same as the notching layer in FIG. 15.

The difference between FIGS. 15 and 16 is that the flare region in FIG. 15 is asymmetrical and the flare region in FIG. 16 is symmetrical. The embodiment shown in FIG. 15 has an advantage from a processing standpoint in that the second pole piece 260 on the side of the notched layer to be notched is recessed further into the head so as to minimize shadowing by the second pole piece when the notched layer is milled, which will be described in more detail hereinafter. This advantage has to be balanced with the magnetics of the head as compared to the typical symmetrical flare region 286 shown in FIG. 16. At this point in the process, the second pole piece 266 in FIG. 15 and the second pole piece at 280 in FIG. 16 have not been formed.

Figure 17:
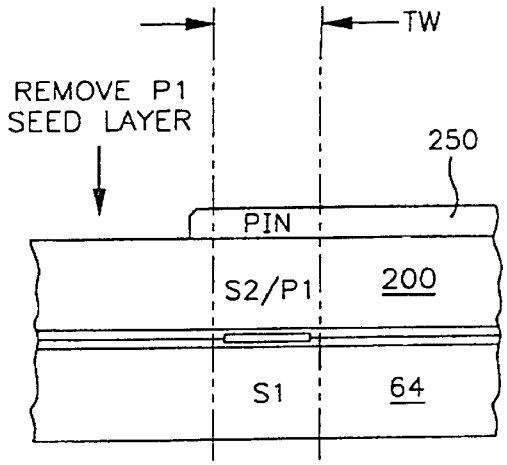
FIG. 17 is an ABS view showing the removal of P1 seed layer.
Figure 18:
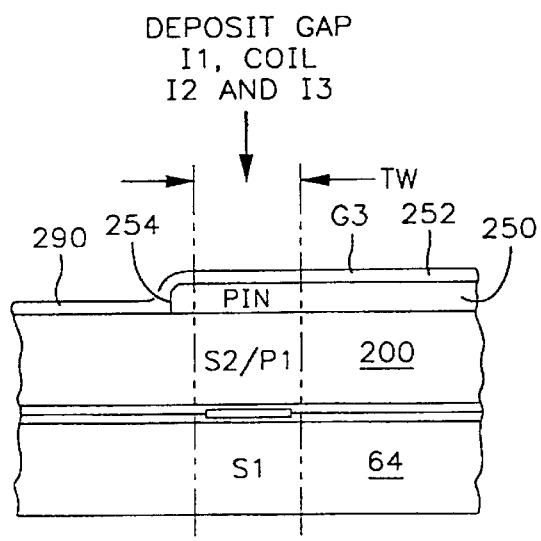
FIG. 18 is an ABS view of the present method showing deposition of a gap layer.

In FIG. 17, the first pole piece seed layer is removed which causes a slight rounding of the upper corner of the notched layer 250. Next, a gap layer 290 is deposited along with a first insulation layer (not shown), a coil layer (not shown), a second insulation layer (not shown) and a third insulation layer (not shown). The first insulation layer, the coil layer, the second insulation layer and the third insulation layer can be seen in FIG. 5 at 70, 68, 72 and 74 respectively. The gap layer 290 is a full film layer which covers the entire top 252 of the notching layer, the side 254 of the notching layer and the remaining lateral expanse of the first pole piece layer.

Figure 19:
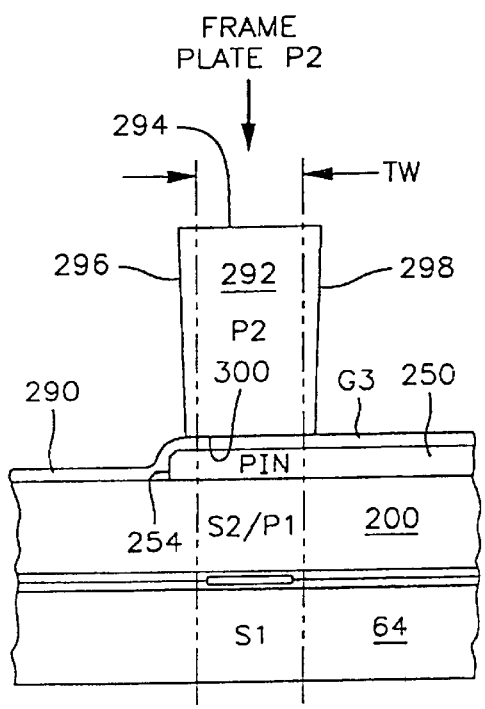
FIG. 19 is an ABS view of the present method showing frame plating the second pole tip.
Figure 20:
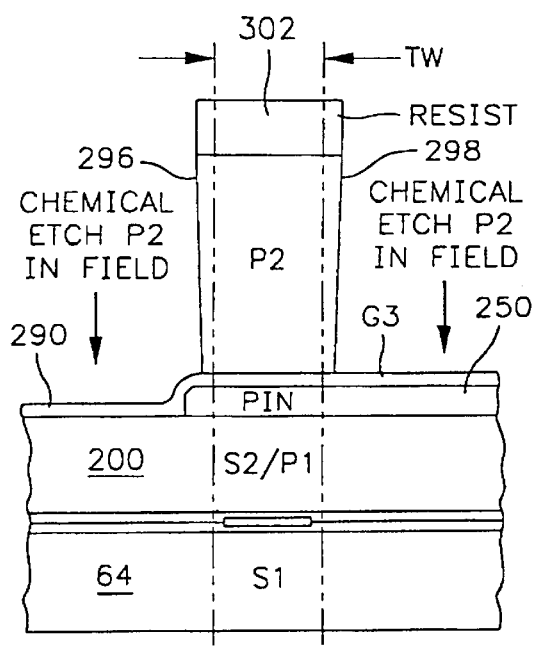
FIG. 20 is an ABS view of the present method showing removal of second pole piece material in the field.
Figure 21:
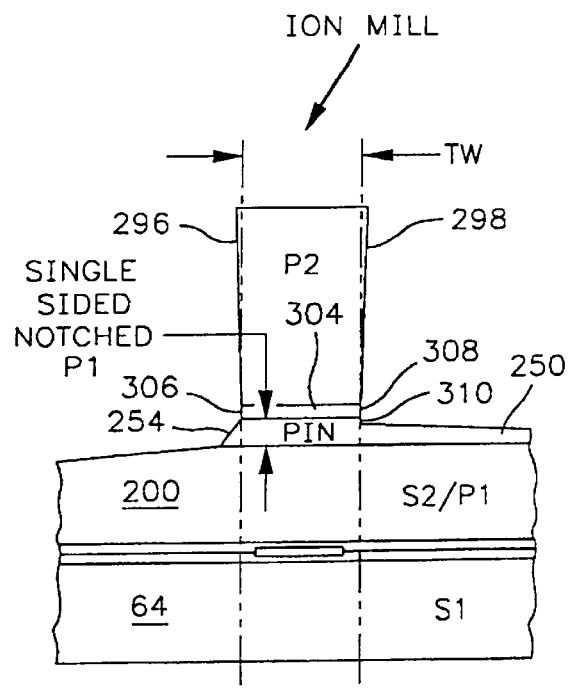
FIG. 21 is an ABS view of the present method showing ion milling to form a single-sided notch with a partial notch on the other side.
Figure 22:
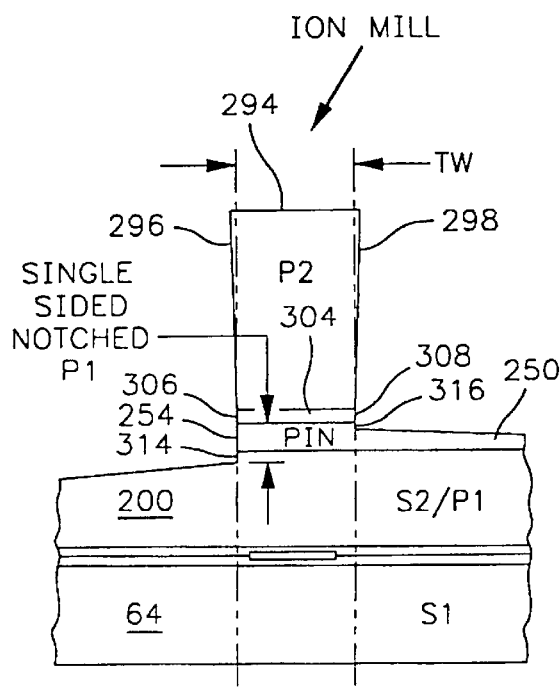
FIG. 22 is similar to FIG. 21 except the first pole piece layer has been slightly notched.
Figure 23:
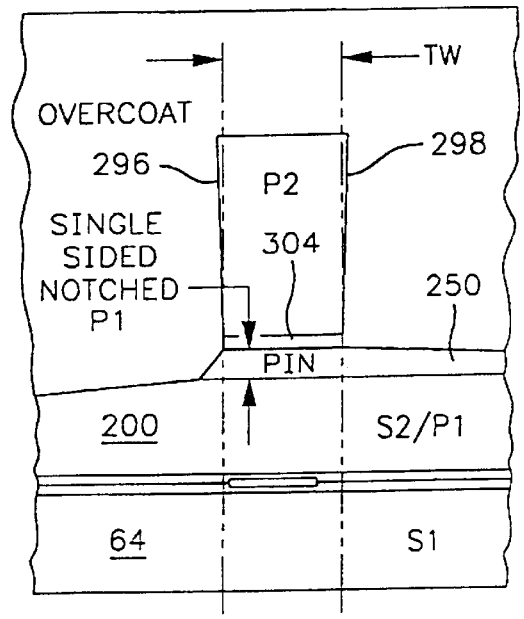
FIG. 23 is an ABS view of an overcoat layer on the embodiment of the invention shown in FIG. 21.

The next step is to frame plate the second pole piece along with a second pole tip 292, as shown in FIG. 19. The second pole tip 292 is bounded by a top 294, first and second side walls 296 and 298 and a base 300. As stated hereinabove, the thickness and width of the second pole tip 292 are enlarged to account for erosion by processing steps, including the subsequent milling step for notching the notching layer 250. In FIG. 20 a resist layer 302 is formed on top of the second pole tip, and second pole piece material located in the field is removed by chemical etching. In FIG. 21 ion milling is implemented at an angle to a normal to the planes of the layers 64 and 200, this angle being preferably 20° to 35°, as discussed hereinabove. This milling reduces the gap layer 290 in FIG. 20 to form a write gap layer 304 with first and second side walls 306 and 308. The milling continues until the first side walls 296, 306 and 254 are contiguous. This milling causes a very slight notching in the large lateral expanse of the notching layer 250, forming a very small side wall 310. For all practical purposes, the first pole piece has been provided with a single notch at 254. In FIG. 22 a longer milling cycle is employed to notch into the first pole piece layer 200 to form a first side wall 314. In this embodiment, the milling cycle is employed until the first side walls 296, 306, 254 and 314 are contiguous. The notching layer on the other side of the pole tip would be slightly notched, as shown at 316. The preferred embodiment is shown in FIG. 21, since less milling time is required, which embodiment is shown formed with an overcoat in FIG. 23. The method shown in FIGS. 14–23 permits the first pole piece to be constructed of materials with different magnetic moments. For instance, the first piece layer 200 can be $Ni_{80}Fe_{20}$ and the notching layer can be $Ni_{45}Fe_{55}$ or the first pole layer 200 can be $Ni_{45}Fe_{55}$ and the notching layer can be $Ni_{80}Fe_{20}$.

Figure 24:
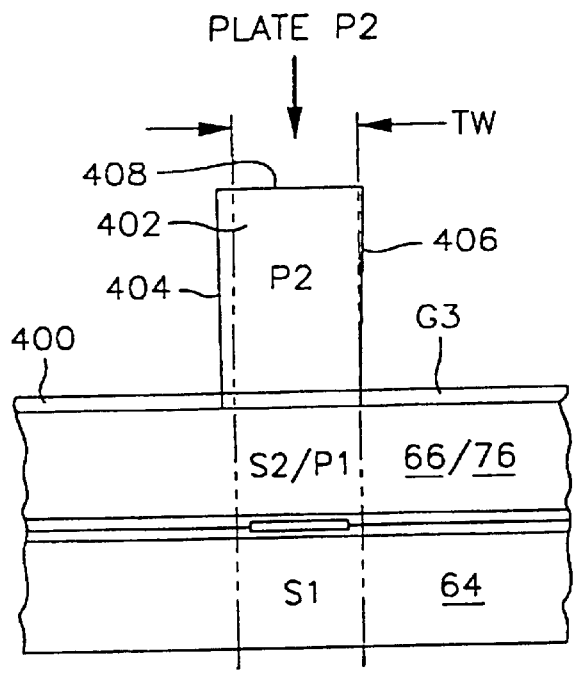
FIG. 24 is an ABS view of an initial step of another embodiment of the present invention showing plating the second pole tip.
Figure 25:
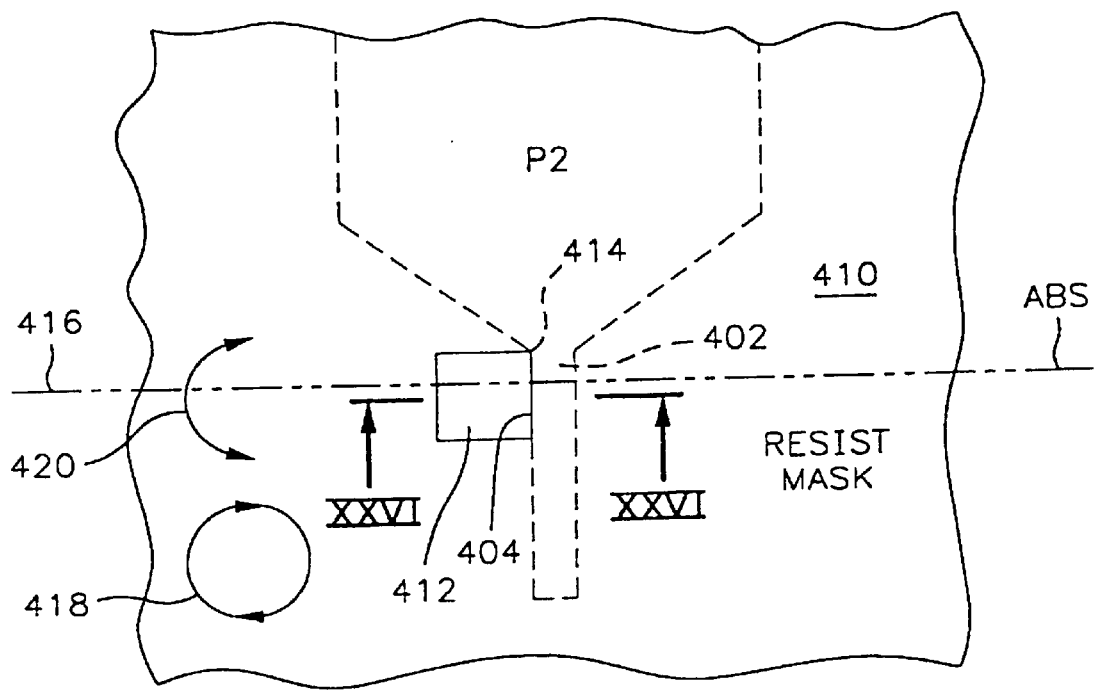
FIG. 25 is a plan view of FIG. 24 after forming a photoresist layer on the workpiece with an opening exposing a work site.
Figure 26:
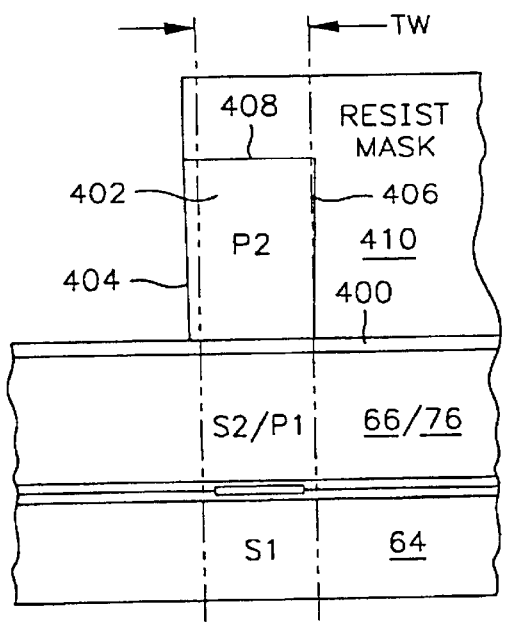
FIG. 26 is a view taken along plane XXVI—XXVI of FIG. 25.
Figure 27:
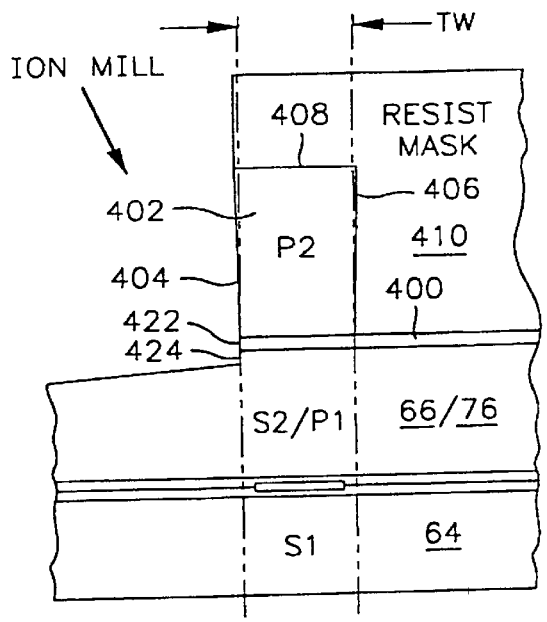
FIG. 27 is similar to FIG. 26 except ion milling is being employed for forming a single-sided notch of the present invention.
Figure 28:
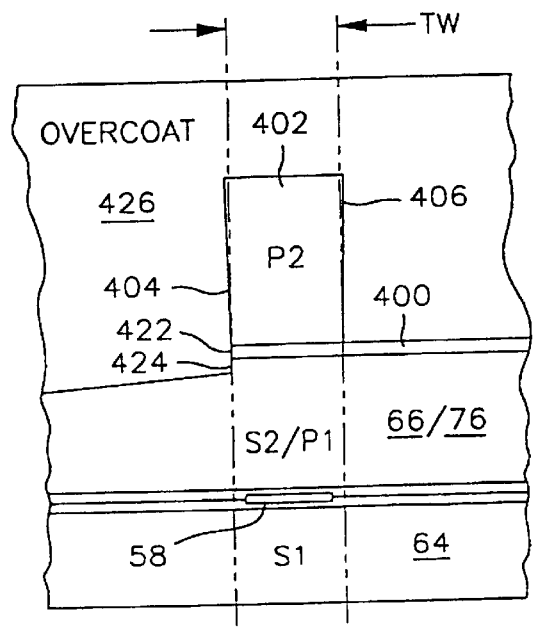
FIG. 28 is an ABS view of the completed magnetic head after forming the overcoat layer thereon.
Figure 29:
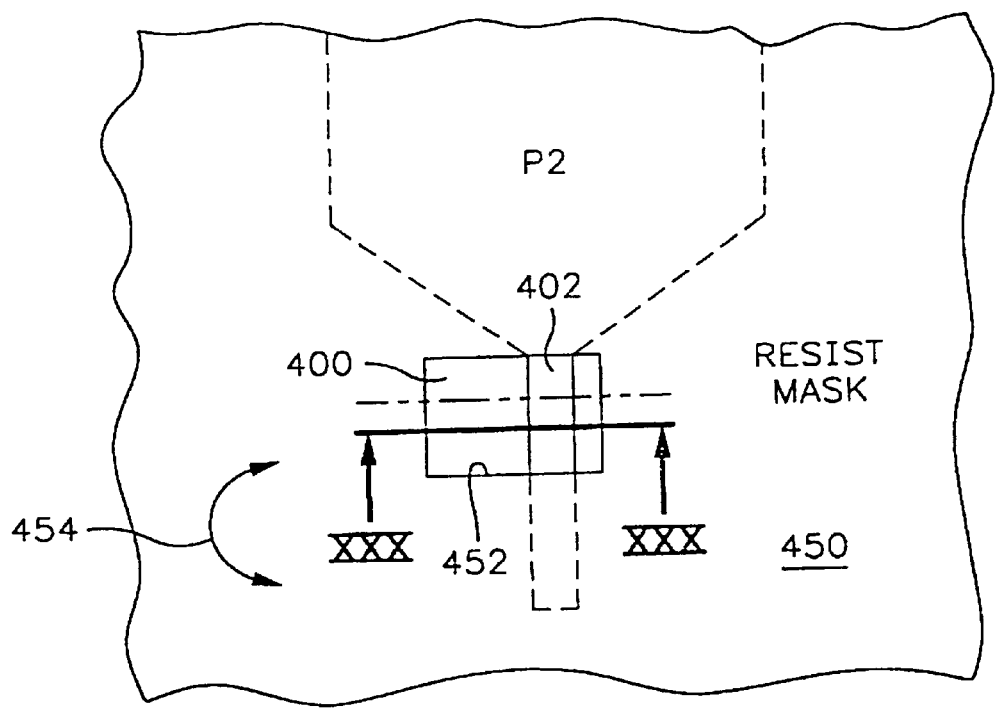
FIG. 29 is a plan view of a further embodiment of the present invention showing a photoresist mask with an opening exposing a work site.

Another embodiment of making the single-sided, notched write head is shown in FIGS. 24–28. After forming a gap layer 400 on the first pole piece layer 66/76, a second pole piece including a second pole tip 402 is formed on the gap layer. The second pole tip 402 has first and second side walls 404 and 406 and a top 408. The second side wall 406 is aligned with the right side of the track width, and the first side wall 406 is extended beyond the left side of the track width, since it is the side that will be partially consumed by milling. A photoresist mask 410 is then formed on the workpiece covering all of the second pole piece as well as the second pole tip 402 with an opening 412. As can be seen from FIG. 25, the opening extends along one side of the second pole tip 402 from a flare point 414 to a location beyond the ABS 416. The opening 412 extends laterally a sufficient distance so that angled milling will be able to notch the first pole piece layer 66/76. FIG. 26 shows the resist mask 410 protecting a right lateral expanse of the gap layer 400, the second side wall 406 and the top 408 of the second pole tip 402. As shown in FIG. 25, the workpiece may be rotated 360°, as shown at 418, or oscillated back and forth approximately 180°, as shown at 420. During full rotation or oscillation, ion milling is employed to mill through the gap layer 400 to form the gap layer with a first side wall 422 and notch the first pole piece layer 66/76 with a first side wall 424. The first side wall 404 of the second pole tip is milled until it is aligned at its base with the left side of the track width (TW), and until it is contiguous with the first side wall 422 of the gap layer and the first side wall 424 of the first pole piece layer. The right side wall 406 of the second pole tip, the top 408 and the gap layer 400 extending from the side wall 406 remain untouched by the milling. Even with full rotation 418, shown in FIG. 25, ion milling in the present invention produces less redeposition and therefore requires less milling time to clean up redeposited material after the notches have been formed, as compared to the prior art method. The milling time is still further decreased when the workpiece is oscillated, as shown at 420 in FIG. 25. When the workpiece is oscillated the notch site is subjected to ion milling substantially 100% of the time. It should be noted, with both rotations, that the top 408 has not been milled, which decreases the height of the second pole tip 402 plated in FIG. 24. Reduction of the height of the pole tip reduces the aspect ratio and promotes construction of a more well-defined, narrow track width second pole tip. Track widths 1 μm or less can be achieved. The next step is to remove the resist mask 410 and form an overcoat layer 426 on the workpiece, as shown in FIG. 28.

Figure 30:
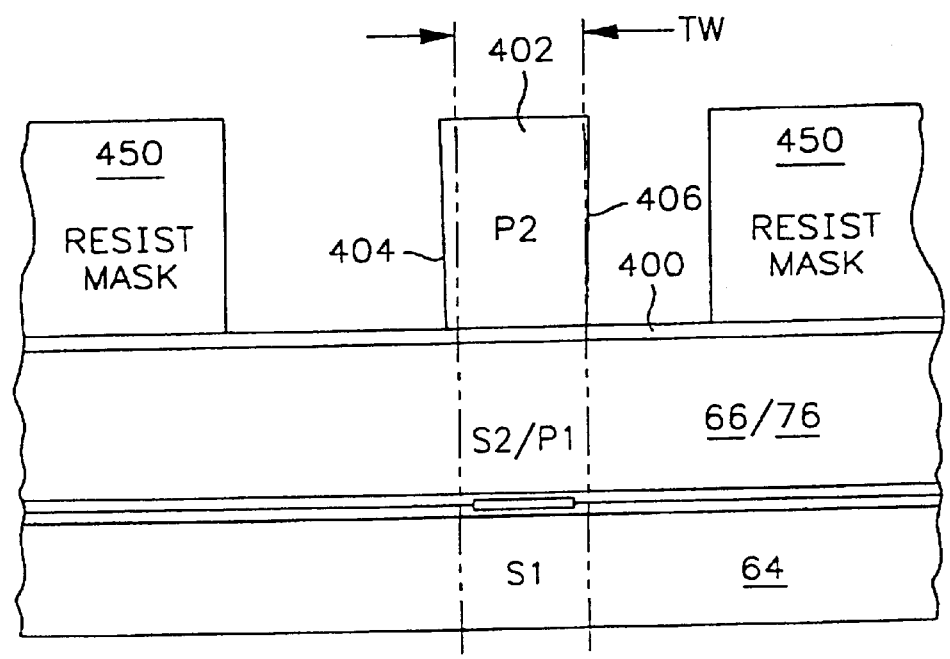
FIG. 30 is an ABS view of a plane taken along the XXX—XXX of FIG. 29.
Figure 31:
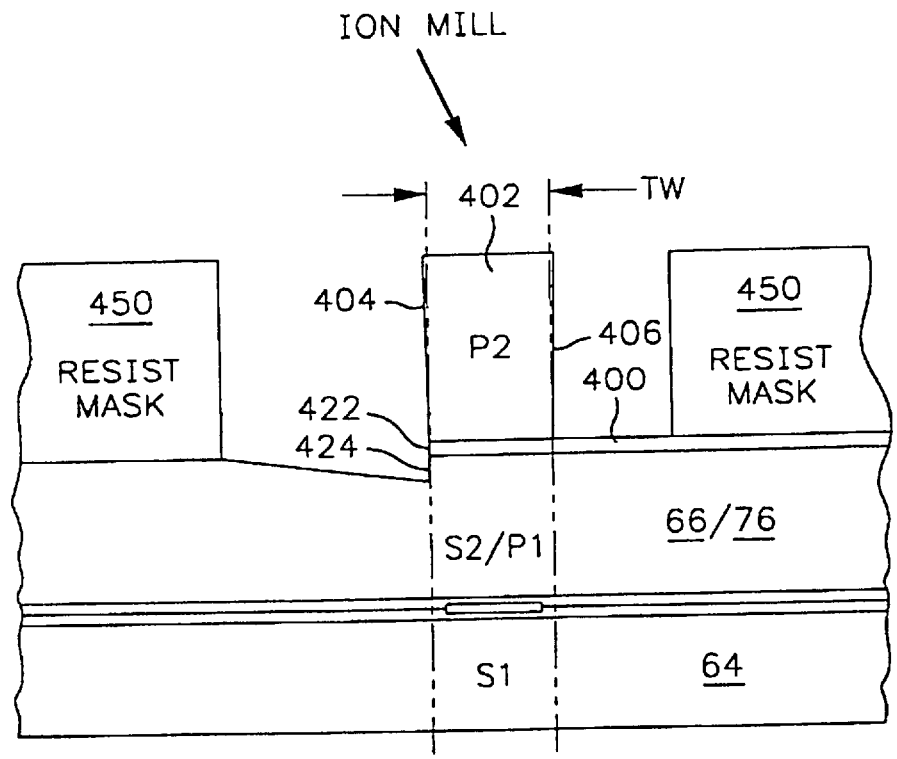
FIG. 31 is similar to FIG. 30 except ion milling has been employed to notch the first pole piece.
Figure 32:
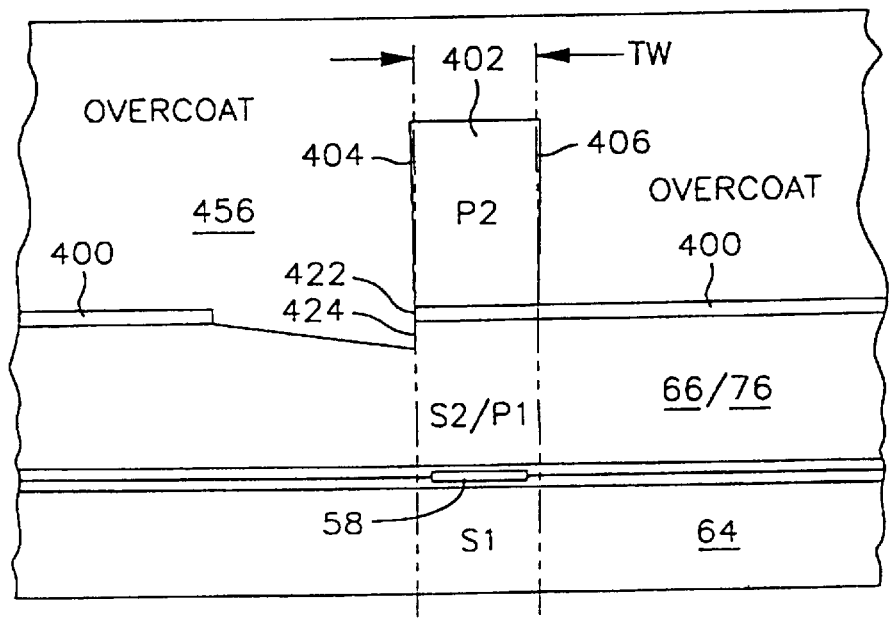
FIG. 32 is an ABS view of the completed head with an overcoat layer.

Another method of making the notched write head is shown in FIGS. 29–32, which is a modification of the method shown in FIGS. 24–28. The first step of this method is the same step as shown in FIG. 24 for the previous method. This method differs from the previous method in that a resist mask 450 is provided with a larger opening 452 exposing the second pole tip 402, as well as portion of the gap layer 400. This method is shown to illustrate that the opening 452 does not have to be located adjacent the first side wall 404 of the second pole tip, as shown in FIG. 25, in order to achieve satisfactory notching of the first pole piece 66/76. FIG. 30 shows an ABS view of the workpiece prior to ion milling. In the method it is preferable to oscillate the workpiece substantially 180° as shown at 454 in FIG. 29. While oscillating the workpiece, ion milling is implemented, as shown in FIG. 31. In this embodiment the gap layer 400 will be milled to form the gap layer with a first side will 422, and the first pole piece layer 66/76 will be notched to form it with a first side 424. The first side wall 404 of the second pole tip is milled in slightly. The milling is continued until the first side wall 404, the first side wall 422 of the gap layer and the first side wall 424 of the first pole piece layer are contiguous, and until the first side 404 of the second pole tip aligns with the left side of the track width. In this embodiment the top 408 is milled down slightly, which requires the second tip 402 to be plated with an extra thickness in the plating step shown in FIG. 24. The next step is to remove the resist mask 450 and form an overcoat layer 456 on the workpiece, as shown in FIG. 32.

Figure 33:
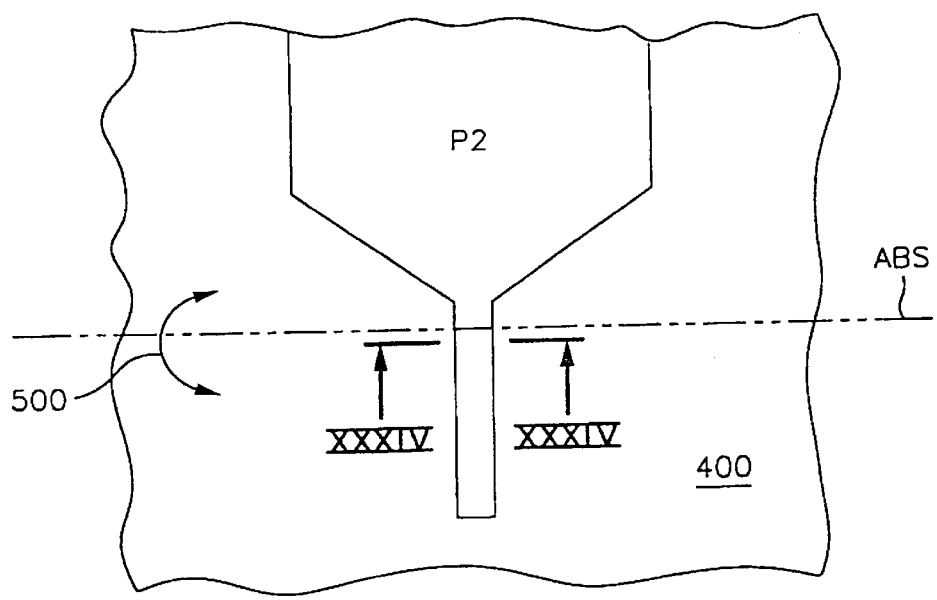
FIG. 33 is an ABS planar view of still another method of the invention.
Figure 34:
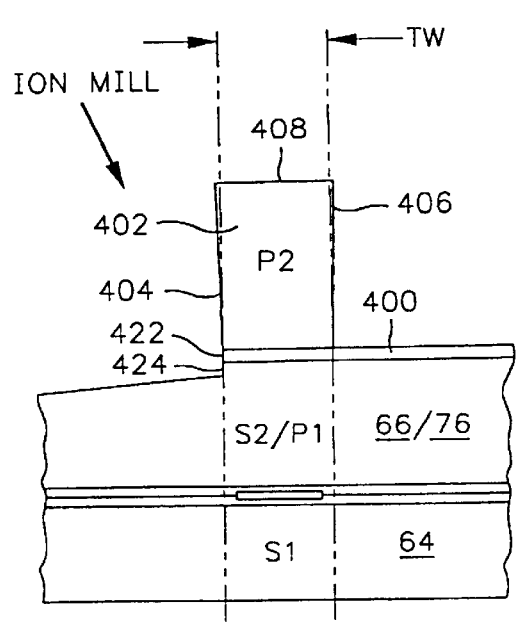
FIG. 34 is an ABS view taken along plane XXXIV—XXXIV of FIG. 33.
Figure 35:
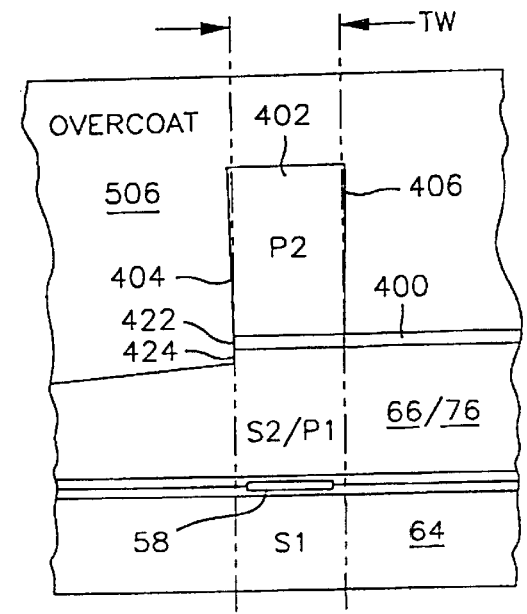
FIG. 35 is an ABS view of the completed head with an overcoat layer.

Another method of constructing the single-sided, notched write head is shown in FIGS. 33–35. This method differs from the previous methods in that a resist mask in not employed. The first step is to plate the second pole piece and second pole tip 402, as shown in FIG. 24. In this method the workpiece is oscillated back and forth substantially 180°, as shown at 500 in FIG. 33. While oscillating the workpiece, ion milling is implemented. As with the previous method, this method mills through the gap layer to form the gap layer 400 with a first side wall 422, and notches the first pole piece layer to form a first side wall 424. The first side wall 424 of the second pole tip milled in slightly until it is aligned with the left side of the track width (TW) and until the first side wall 404 of the second pole tip, the first side wall 422 of the gap layer and the first side wall 424 of the first pole piece layer are contiguous, as shown in FIG. 34. In this embodiment, the top 408 of the second pole tip will be milled down slightly, requiring the second pole tip 402 to be plated with an extra thickness in the plating step shown in FIG. 24. Further, in this embodiment there will be more redeposited material on the second side 406 of the second pole tip, requiring an ion milling step to perform clean-up. To implement clean-up, the ion milling angle is increased to about 65° from a normal to the planes of the layers. The next step is to form an overcoat layer 506 on the workpiece, as shown in FIG. 35.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of making a magnetic head assembly that has an air bearing surface (ABS), comprising:

forming a first pole piece layer;

forming a gap layer on the first pole piece layer;

forming a second pole tip layer on the gap layer with first and second side walls that have a width at the ABS that is greater than a target track width;

milling the first pole piece layer substantially only adjacent the first side wall of the second pole tip layer until the first pole piece layer, the gap layer and the first pole piece layer have contiguous side walls and the second pole tip layer has said target track width.

2. A method as claimed in claim 1, wherein the target track width is 1 μm or less.

3. A method as claimed in claim 1, further including:

before milling, protecting the first pole piece layer adjacent the second side wall of the pole tip layer.

4. A method as claimed in claim 1, further including:

said milling forming the first pole piece with a notch;

before milling, protecting the first pole piece layer with a photoresist layer; and, providing an opening in the photoresist layer exposing a notch site where said notch is to be formed.

5. A method as claimed in claim 1, further including:

said milling forming the first pole piece with a notch; and during milling, oscillating the layers back and forth less than 360° with the milling directed at a notch site where said notch is to be formed.

6. A method as claimed in claim 5, including:

before milling, protecting the first pole piece layer with a photoresist layer and providing an opening in the photoresist layer exposing the notch site.

7. A method of making a magnetic head assembly that has an air bearing surface (ABS), comprising:

forming a notching layer on a first pole piece layer with a width at the ABS that is less than a width of the first pole piece layer at the ABS;

forming a gap layer on the notching layer;

forming a second pole tip layer on the gap layer with a track width wider than a target track width;

milling each of the second pole tip layer and the gap layer with first and second side walls, the notching layer with a first side wall, that has a height, and the notching layer with a range of having no right side wall to having a right side wall with a height less than the height of the first side wall of the notching layer; and continuing said milling until the first side walls are contiguous, the second side walls are contiguous and the second pole tip layer has a target track width.

8. A method as claimed in claim 7, further including:
milling the notching layer with only a first side wall.

9. A method as claimed in claim 7, further including:
forming the layers on a substrate;
milling at an angle to a normal to surface planes of the layers;
said milling forming the notching layer with a single notch; and
during milling, oscillating the substrate back and forth less than 360° with said milling directed at a single notch site where said notch is to be formed.

10. A method as claimed in claim 7, wherein the notching layer has a thickness 0.2 μm to 1.0 μm.

11. A method as claimed in claim 7, wherein the first pole piece layer is substantially $Ni_{80}Fe_{20}$ and the notching layer is substantially $Ni_{45}Fe_{55}$.

12. A method as claimed in claim 7, wherein the first pole piece layer is substantially $Ni_{45}Fe_{55}$ and the notching layer is substantially $Ni_{80}Fe_{20}$.

13. A method of making a magnetic head assembly that has an air bearing surface (ABS), comprising:
forming a notching layer on a first pole piece layer;
forming a gap layer on the notching layer;
forming a second pole tip layer on the gap layer and on the notching layer so that the notching layer has first and second width portions extending away from first and second sidewalls respectively of the second pole tip layer; and
milling the notching layer to notch only one of the first and second width portions adjacent one of the first and second side walls respectively of the second pole tip layer.

14. A method as claimed in claim 13, wherein the first pole piece layer is substantially $Ni_{80}Fe_{20}$ and the notching layer is substantially $Ni_{45}Fe_{55}$.

15. A method as claimed in claim 13, wherein the first pole piece layer is substantially $Ni_{45}Fe_{55}$ and the notching layer is substantially $Ni_{80}Fe_{20}$.

16. A method as claimed in claim 13, wherein the notching layer has a thickness 0.2 μm to 1.0 μm.

17. A method of making a magnetic head assembly that has an air bearing surface (ABS), comprising:
forming a notching layer on a first pole piece layer with the notching layer having a width at the ABS that is less than a width of the first pole piece layer at the ABS;
forming a gap layer on the notching layer;
forming a second pole tip layer on the gap layer with a width at the ABS that is greater than a target track width; and
milling the second pole tip layer, the gap layer and the notching layer until: (1) the second pole tip layer, the gap layer and the notching layer have contiguous first side walls, (2) only the second pole tip layer and the gap layer have contiguous second side walls and (3) the second pole tip layer has substantially said target track width.

18. A method as claimed in claim 17, wherein the first pole piece layer is substantially $Ni_{80}Fe_{20}$ and the notching layer is substantially $Ni_{45}Fe_{55}$.

19. A method as claimed in claim 17, wherein the first pole piece layer is substantially $Ni_{45}Fe_{55}$ and then notching layer is substantially $Ni_{80}Fe_{20}$.

20. A method as claimed in claim 17, wherein the notching layer has a thickness 0.2 μm to 1.0 μm.

* * * * *